(No Model.)
T. V. CURTIS.
COMBINED WATER FILTER AND COOLER.
No. 264,443. Patented Sept. 19, 1882.
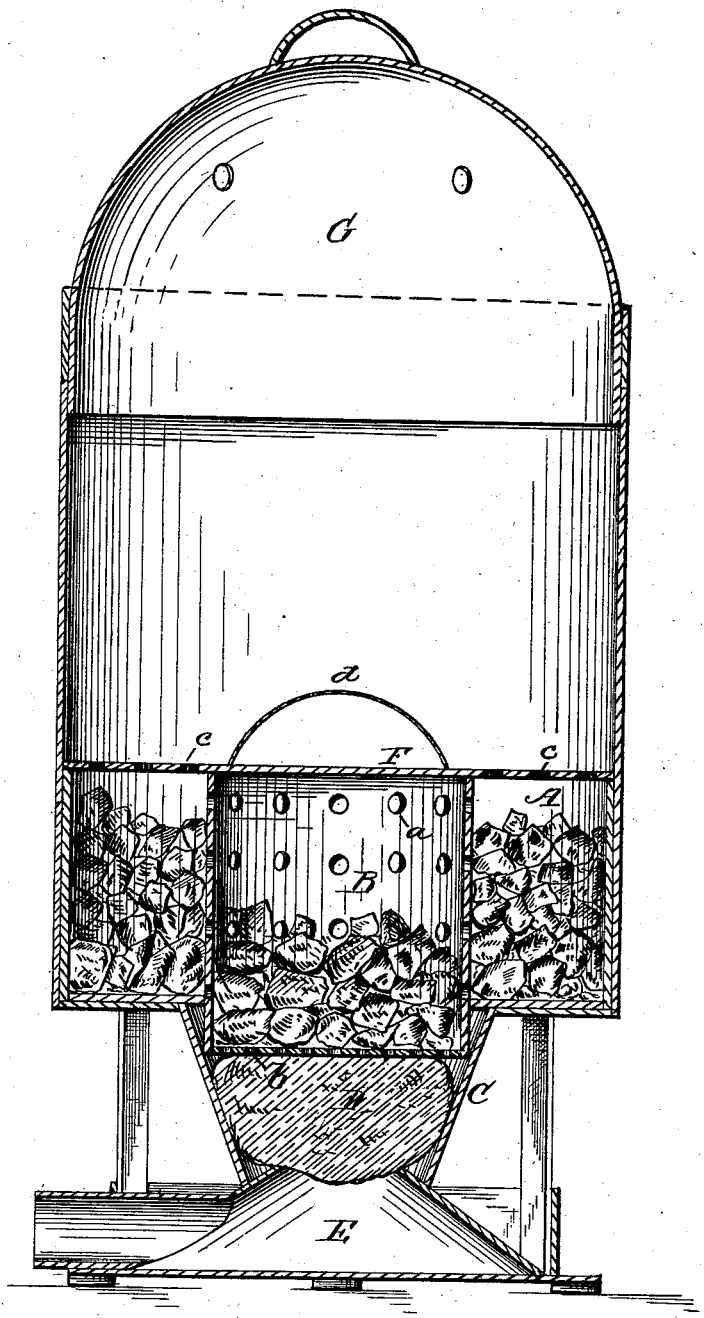
WITNESSES
INVENTOR
Thomas V. Curtis
per Chas. H. Fowler
Attorney

UNITED STATES PATENT OFFICE.

THOMAS V. CURTIS, OF ST. PAUL, MINNESOTA.

COMBINED WATER FILTER AND COOLER.

SPECIFICATION forming part of Letters Patent No. 264,443, dated September 19, 1882.

Application filed July 10, 1882. (No model.)

*To all whom it may concern:*

Be it known that I, THOMAS V. CURTIS, a citizen of the United States, residing at St. Paul, in the county of Ramsey and State of Minnesota, have invented certain new and useful Improvements in Combined Water Filter and Cooler; and I do hereby declare that the following is a full, clear, and exact description of the same, reference being had to the annexed drawing, making a part of this specification, and to the letters and figures of reference marked thereon.

This invention relates to devices for purifying and cooling water and rendering it free from poisonous and distasteful substances; and the object of the present invention is to provide a simple, easily-constructed, and durable filter, that will thoroughly cleanse the water of impurities and at the same time allow of its being cooled, so as to render it more palatable when used for drinking purposes. These objects I attain by the construction substantially as shown in the drawing and hereinafter described.

The accompanying drawing represents a filter and cooler constructed of sheet metal or other suitable material, in which—

A represents a chamber for holding charcoal or other cleansing and purifying ingredients, this chamber being also provided with a central receptacle, B, having perforations *a*, through which the water enters from the chamber A, and is again filtered through a cleansing and purifying material contained therein.
This receptacle B extends below the bottom of the chamber A and enters a cup, C, in which is placed a sponge, D, and is provided with perforations *b* in its bottom to allow the water to percolate through the sponge D and enter a reservoir, E, from which it is drawn, when required for use, free of any impurities or unhealthy substances.

Above the chamber A is placed a cover, F, of a size equal to the inner diameter of the filtering-vessel, and provided with perforations *c* beyond the line of the receptacle B, this said cover also having a handle, *d*, to allow of its ready removal when desired to remove or replenish the ingredients in the chamber A and receptacle B. Above the cover F is placed the ice and water, the water entering the chamber A through the perforations *c*, and the whole covered and protected by a suitable cover, G.

The reservoir E is made slightly conical, and projects up into the sponge-cup C to form a seat for the sponge to rest upon.

It will be seen by the above description that I have constructed a simple and effective cooler and filter having its several parts removable to allow of the ready removal or replenishing of the cleansing and purifying ingredients, and which will thoroughly cleanse and purify the water of any deleterious substances and render the same palatable to the consumer.

When it is desired to furnish water of a mineral or curative character the charcoal or other simply purifying ingredient may be removed and the water filtered through a mineral or other desirable substance.

Having now fully described my invention, what I claim as new, and desire to secure by Letters Patent, is—

In a combined water cooler and filter, a suitable vessel provided with the removable chamber A and central receptacle, B, for containing a filtering substance, in combination with a perforated cover, F, sponge-cup C, and reservoir E, all constructed and arranged substantially as shown and described.

In testimony that I claim the above I have hereunto subscribed my name in the presence of two witnesses.

THOMAS V. CURTIS.

Witnesses:
A. R. MCGILL,
CHAS. SHANDREW.